(12) United States Patent
Ramani et al.

(10) Patent No.: US 10,090,533 B2
(45) Date of Patent: Oct. 2, 2018

(54) NON-CARBON MIXED-METAL OXIDE SUPPORT FOR ELECTROCATALYSTS

(71) Applicant: Nissan North America, Inc., Franklin, TN (US)

(72) Inventors: Vijay K. Ramani, Chicago, IL (US); Ellazar Niangar, Farmington Hills, MI (US); Nilesh Dale, Novi, MI (US); Taehee Han, West Bloomfield, MI (US)

(73) Assignees: Nissan North America, Inc., Franklin, TN (US); Vijay K. Ramani, Chicago, IL (US)

( * ) Notice: Subject to any disclaimer, the term of this patent is extended or adjusted under 35 U.S.C. 154(b) by 0 days.

(21) Appl. No.: 15/386,500

(22) Filed: Dec. 21, 2016

(65) Prior Publication Data

US 2017/0098832 A1 Apr. 6, 2017

Related U.S. Application Data

(63) Continuation of application No. 14/169,536, filed on Jan. 31, 2014.

(51) Int. Cl.
*H01M 4/92* (2006.01)
*H01M 4/88* (2006.01)
*H01M 8/1018* (2016.01)

(52) U.S. Cl.
CPC ......... *H01M 4/925* (2013.01); *H01M 4/8817* (2013.01); *H01M 2008/1095* (2013.01)

(58) Field of Classification Search
CPC .................. H01M 4/925; H01M 4/8817
See application file for complete search history.

(56) References Cited

U.S. PATENT DOCUMENTS

| | | |
|---|---|---|
| 6,855,453 B2 | 2/2005 | Bett et al. |
| 6,936,370 B1 | 8/2005 | Knights et al. |
| 7,902,111 B2 | 3/2011 | Roev et al. |
| 2003/0198849 A1 | 10/2003 | Hampden-Smith et al. |
| 2013/0065155 A1 | 3/2013 | Ho et al. |
| 2013/0087461 A1 | 4/2013 | Kintrup et al. |
| 2013/0122402 A1 | 5/2013 | Hong et al. |
| 2014/0349203 A1 | 11/2014 | Klose-Schubert et al. |

FOREIGN PATENT DOCUMENTS

WO    2013092568 A1    6/2013

OTHER PUBLICATIONS

Daolio et al., "Characterization of RuO2-based Film Electrodes by Secondary Ion Mass Spectrometry", J. Mater. Chem., 1994, 4(8), 1255-1258 (Year: 1994).*

* cited by examiner

Primary Examiner — Jimmy Vo
(74) Attorney, Agent, or Firm — Young Basile Hanlon & MacFarlane, P.C.

(57) ABSTRACT

A non-carbon support particle is provided for use in electrocatalyst. The non-carbon support particle consists essentially of titanium dioxide and ruthenium dioxide. The titanium and ruthenium can have a mole ratio ranging from 1:1 to 9:1 in the non-carbon support particle. Also disclosed are methods of preparing the non-carbon support and electrocatalyst taught herein.

10 Claims, 15 Drawing Sheets

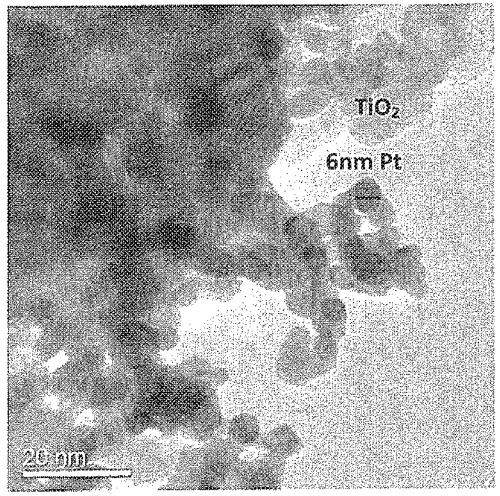 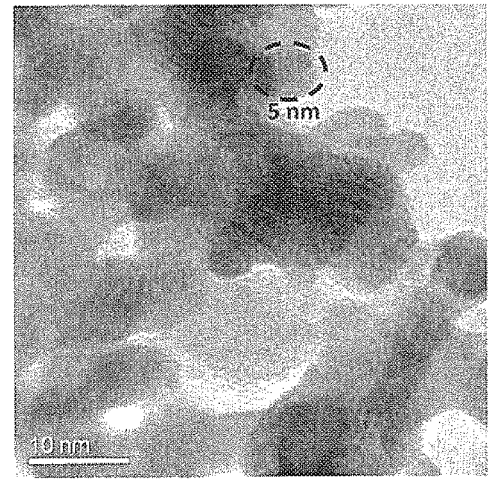
FIG. 11A  FIG. 11B
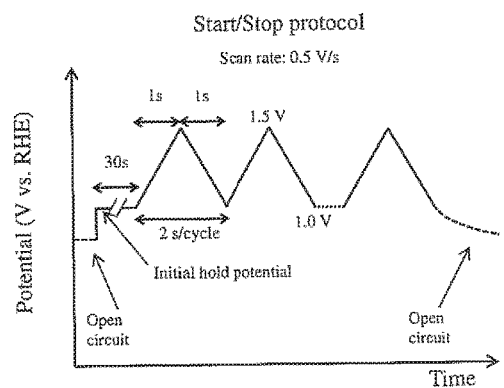
FIG. 12A
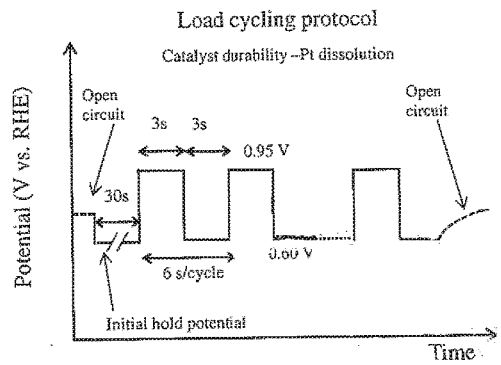
FIG. 12B

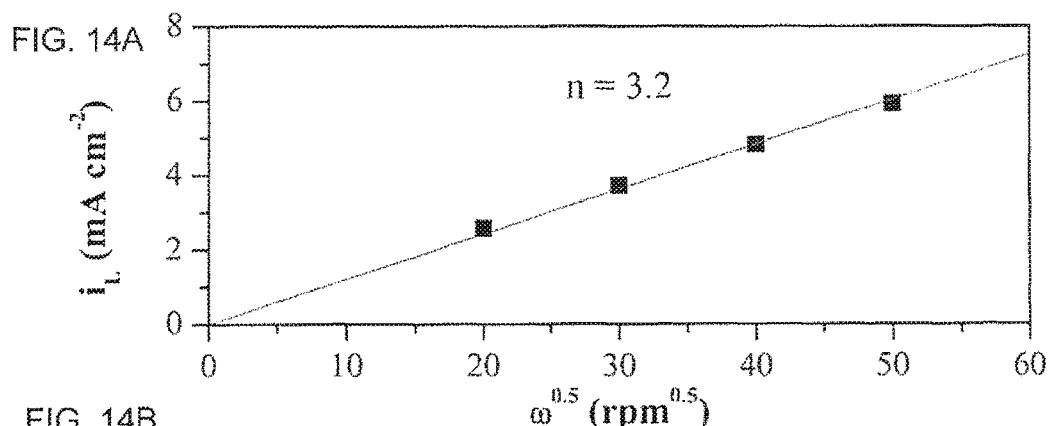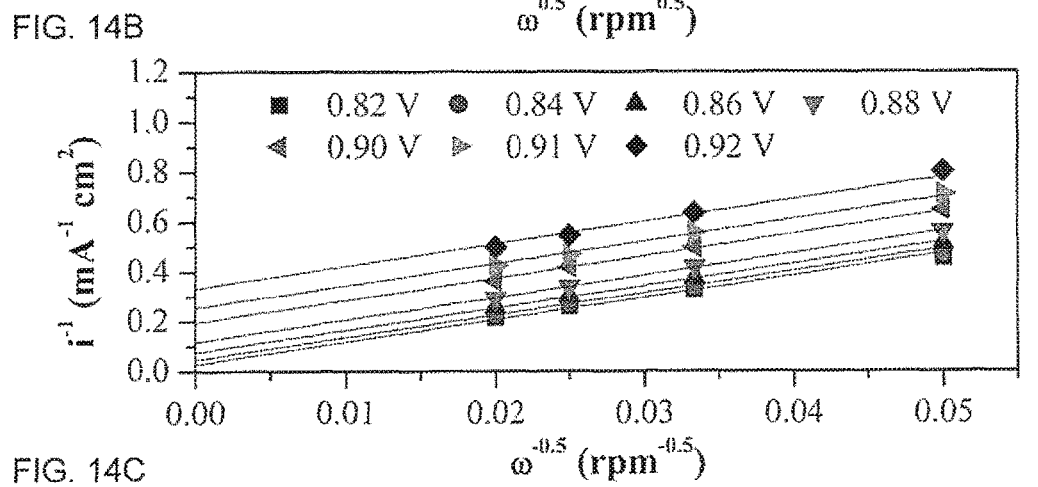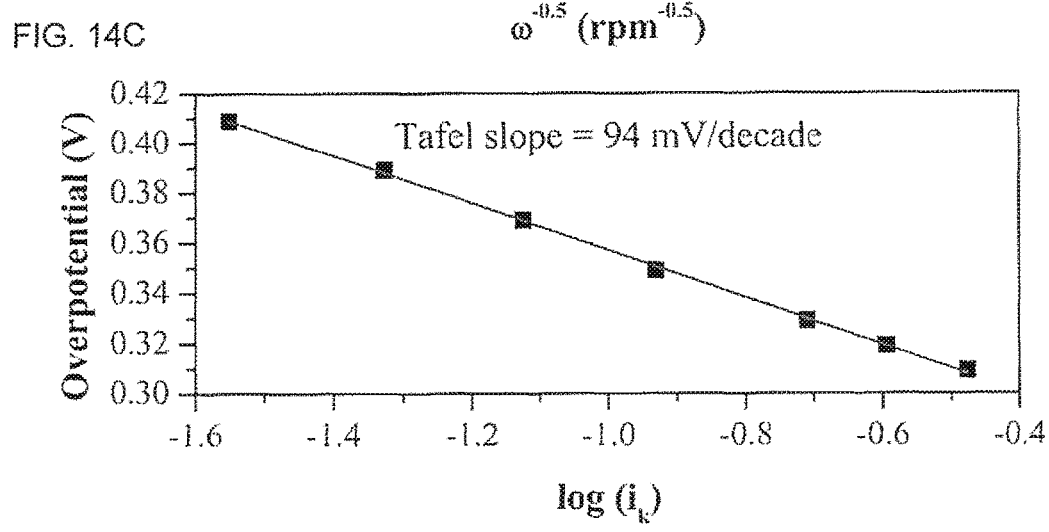

NON-CARBON MIXED-METAL OXIDE SUPPORT FOR ELECTROCATALYSTS

CROSS-REFERENCE TO RELATED APPLICATION

This application is a continuation of U.S. patent application Ser. No. 14/169,536, filed on Jan. 31, 2014, and incorporated herein in its entirety.

TECHNICAL FIELD

This disclosure relates to non-carbon mixed material support for electrocatalysts, and in particular, to a titanium-ruthenium oxide support used to produce electrocatalysts for hydrogen fuel cell vehicles.

BACKGROUND

Carbon has traditionally been the most common material of choice for polymer electrolyte fuel cell (PEFC) electrocatalyst supports due to its low cost, high abundance, high electronic conductivity, and high Brunauer, Emmett, and Teller (BET) surface area, which permits good dispersion of platinum (Pt) active catalyst particles. However, the instability of the carbon-supported platinum electrocatalyst is a key issue that currently precludes widespread commercialization of PEFCs for automotive applications.

Carbon is known to undergo electrochemical oxidation to carbon dioxide. Despite the fact that the cathode potential is usually significantly higher than the standard potential for carbon oxidation, the actual rate of carbon oxidation is very slow due to a very low standard heterogeneous rate constant. During operation of automotive PEFC stacks, fuel/air mixed fronts are known to occur during stack startup and shutdown. Air usually fills the flow channels when the stack is nonoperational. During startup, the hydrogen fed into the stack displaces the air from the anode flow channels, leading to a mixed fuel-oxidant. These mixed-reactant fronts result in significant electrode polarization. Under these conditions, the PEFC cathode can experience high potentials, corresponding to a significantly higher overpotential for the carbon oxidation reaction. The electrochemical reaction rate constant, which increases exponentially with overpotential, is significantly enhanced during this period. Under these conditions, carbon corrosion is exacerbated.

In a second mechanism, fuel starvation at the anode catalyst sites as a consequence of fuel overutilization or flooding (lack of fuel access to catalyst site) also exacerbates carbon corrosion. In this case, carbon is oxidized to provide protons and electrons in place of the absent fuel.

The adverse consequences of carbon corrosion include (i) platinum nanoparticle agglomeration/detachment; (ii) macroscopic electrode thinning/loss of porosity in the electrode; and (iii) enhanced hydrophilicity of the remaining support surface. The first results in loss of catalyst active surface area and lower mass activity resulting from reduced platinum utilization, whereas the second and third result in a lower capacity to hold water and enhanced flooding, leading to severe condensed-phase mass transport limitations. Clearly, both consequences directly impact PEFC cost and performance, especially in the context of automotive stacks.

SUMMARY

A non-carbon support particle is disclosed for use in electrocatalyst. The non-carbon support particle consists essentially of titanium dioxide and ruthenium dioxide. The titanium and ruthenium can have a mole ratio ranging between 1:1 and 9:1 in the non-carbon support particle. The titanium dioxide has a first particle size and the ruthenium dioxide has a second particle size, and the first particle size and the second particle size can be substantially equal.

Also disclosed is an electrocatalyst, comprising the non-carbon support particles and with precious metal active catalyst particles deposited onto the non-carbon support particles. The precious metal active catalyst particles can be platinum. Also disclosed is an electrode for a fuel cell comprising the electrocatalyst taught herein.

Also disclosed are methods of preparing the non-carbon support and electrocatalyst taught herein. One method of preparing a non-carbon support particle for use in electrocatalyst comprises dispersing titanium dioxide nanopowder in liquid and mixing for a first period of time, precipitating ruthenium hydroxide on the titanium dioxide nanopowder to form non-carbon support particles consisting essentially of titanium dioxide and ruthenium dioxide, filtering the non-carbon support particles from the liquid and drying the non-carbon support particles.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which:

FIGS. 11A and 11B are micrographs of the Pt/$TiO_2$—$RuO_2$ catalyst showing Pt particle size;

FIG. 12A is a schematic diagram of the start-stop protocol;

FIG. 12B is a schematic diagram of the load cycling protocol;

FIGS. 14A-14C are a Levich plot showing the number of electrons transferred, a Koutechy-Levich plot and a Tafel slope obtained from the kinetic currents extracted from the Koutechy-Levich plot, respectively, for 40% Pt/TiO$_2$—RuO$_2$ catalyst;

DETAILED DESCRIPTION

Figure 1:
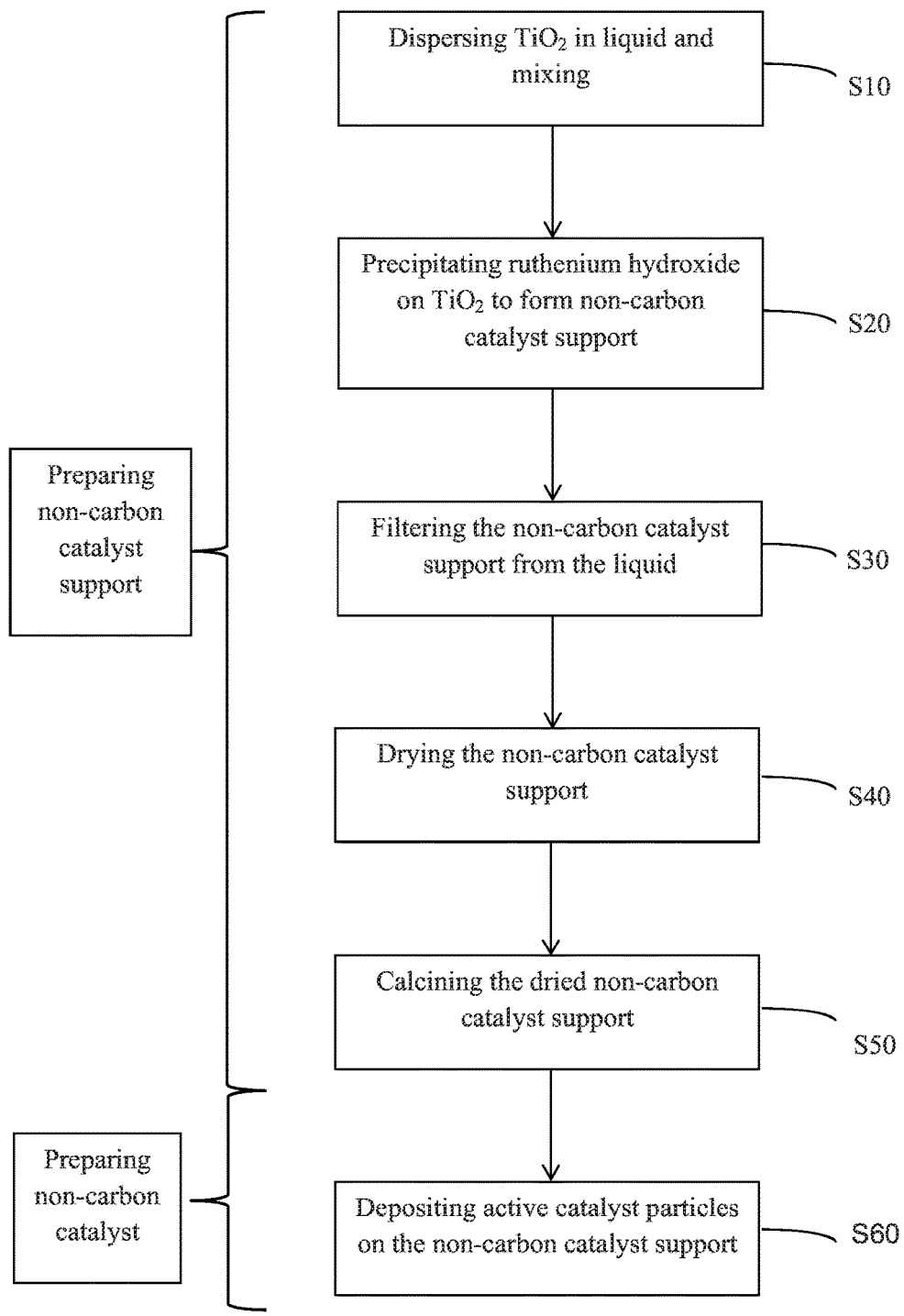
FIG. 1 is a flow diagram of a method of preparing a non-carbon catalyst support and non-carbon electrocatalyst as disclosed herein.

A viable alternative non-carbon support should possess high surface area and electron conductivity, in addition to being highly corrosion resistant across the anticipated potential/pH window. The titanium oxide-ruthenium oxide (TiO$_2$—RuO$_2$) support disclosed by the inventors herein meets these criteria.

Titanium oxide (TiO$_2$) has very good chemical stability in acidic and oxidative environments. However, titania is a semiconductor and its electron conductivity is very low. Substoichiometric titanium oxides (Ti$_2$O$_3$, Ti$_4$O$_7$, Magnéli phases) obtained by heat treatment of TiO$_2$ in a reducing environment (i.e., hydrogen, carbon) have electron conductivity similar to graphite as a consequence of the presence of oxygen vacancies in the crystalline lattice. However, the heat treatment process reduces the surface area of these materials, precluding the preparation of supported electrocatalysts with good Pt dispersion.

To overcome the deficiencies of the TiO$_2$ alone, a non-carbon mixed-metal oxide support of TiO$_2$ and ruthenium oxide (RuO$_2$) as disclosed herein was developed. The disclosed TiO$_2$—RuO$_2$ support demonstrates both excellent initial performance and exceptional stability upon exposure to an extremely stringent accelerated test when compared to benchmarks. The non-carbon support particle consists essentially of titanium dioxide and ruthenium dioxide. The titanium and ruthenium can have a mole ratio ranging between 1:1 and 9:1 in the non-carbon support particle, and the particle sizes of the titanium dioxide and the ruthenium dioxide can be substantially equal.

A catalyst comprising the TiO$_2$—RuO$_2$ support on which a precious metal active catalyst particle such as platinum is deposited (Pt/TiO$_2$—RuO$_2$ catalyst) is also disclosed. The catalyst comprising the TiO$_2$—RuO$_2$ support can be used in an electrode for a fuel cell.

The electrochemical stability of the unique Pt/TiO$_2$—RuO$_2$ electrocatalyst was investigated using both ex situ and in situ tests. The accelerated test protocols include a start-stop protocol and a load cycling protocol. The start-stop protocol mimicks the potential transients that are observed during fuel cell stack startup and shutdown and that contribute to severe electrocatalyst support corrosion, whereas the load-cycling protocol mimicked potential transients seen during full-load to no-load transitions that are sometimes encountered during fuel cell operation, and that contribute to platinum dissolution.

The ex situ screening studies indicate that the Pt/TiO$_2$—RuO$_2$ is an electrocatalyst with exceptionally high stability, but lower activity as a result of larger platinum particle size. Though ex situ tests are useful to screen new candidate materials, the true viability of an electrocatalyst can only be ascertained from in situ tests in a MEA. MEA tests demonstrate both high performance and, more importantly, the exceptional stability of the Pt/TiO$_2$—RuO$_2$ electrocatalyst. Despite the larger Pt particle size in Pt/TiO$_2$—RuO$_2$ catalyst, the Pt/TiO$_2$—RuO$_2$ electrocatalyst yields initial MEA performance slightly lower to that obtained with the benchmark Pt/HSAC electrocatalyst. Because the beginning-of-life and end-of-life performances were nearly identical, the Pt/TiO$_2$—RuO$_2$ catalyst is an electrocatalyst that meets durability targets for automotive fuel cell stacks. Using appropriate processing methods to lower Pt particle size, the activity of the Pt/TiO$_2$—RuO$_2$ can be further enhanced.

When the catalysts were subjected to the load-cycling protocol for 10,000 cycles, there was a significant loss in electrochemical surface area observed in each case, consistent with platinum dissolution and agglomeration. Though TiO$_2$—RuO$_2$ is a corrosion-resistant catalyst support, it is not designed to mitigate Pt dissolution. However, there was minimal detrimental impact on performance for either catalyst despite the significant Pt dissolution observed. This result suggests that the stability of the support is far more important than the stability of the platinum particles that are loaded onto the support in terms of avoiding stack failure. The fuel cell stack is likely to be much more forgiving of platinum dissolution and agglomeration during load cycling than of support corrosion and related effects arising from startup and shutdown cycles. In conjunction with the fact that hybridization methods will inevitably be used to minimize load cycling, identifying a corrosion-resistant support is a key priority, and TiO$_2$—RuO$_2$ support is such a support.

In a first set of examples, core-shell TiO$_2$—RuO$_2$ supports in hydrous and anhydrous forms were prepared and electrochemical properties, including electrical conductivity, oxygen reduction reaction (ORR) kinetics, stability and fuel cell performance, were obtained. Platinum (Pt) supported on anhydrous TiO$_2$—RuO$_2$ catalyst exhibits mass activity of ORR similar to that of commercial Pt supported on carbon catalyst and higher than that of hydrous TiO$_2$—RuO$_2$ catalyst. Under the same measurement conditions, fuel cell performance of Pt/anhydrous TiO$_2$—RuO$_2$ was higher than that of Pt supported on silicon dioxide-ruthenium oxide (SiO$_2$—RuO$_2$) support and similar with that of commercial Pt supported on carbon support.

As shown in FIG. 1, a method of preparing a non-carbon support particle for use in electrocatalyst comprises dispersing titanium dioxide nanopowder in liquid and mixing for a first period of time in step S10. In step S20, ruthenium hydroxide is precipitated on the titanium dioxide nanopowder to form non-carbon support particles consisting essentially of titanium dioxide and ruthenium dioxide. The non-carbon support particles are filtered from the liquid in step S30 and dried in step S40. The dried non-carbon support particles can be calcined in step S50, at 450° C., for example. Examples of preparing the non-carbon catalyst support are provided in more detail herein.

Also shown in FIG. 1 is a method of preparing a non-carbon electrocatalyst comprising the steps S10-S50 for preparing the non-carbon support particle, and further comprising depositing precious metal active particles on the non-carbon support particles in step S60 by reducing an active catalyst precursor with acid. The precious metal active particles can be platinum particles, as a non-limiting example.

Figure 2:
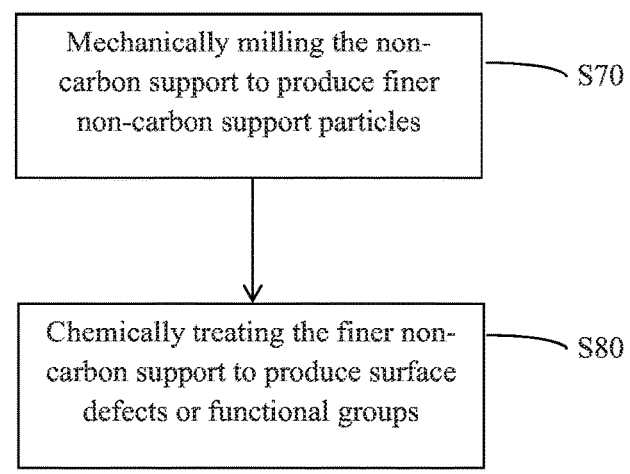
FIG. 2 is a flow diagram of a process of modifying a surface of the non-carbon catalyst support.

Active catalyst particles must be well anchored on the support to realize the activity potential of the catalyst. Defect sites on support particles facilitate the dispersion and anchoring of the active catalyst particles. When catalyst supports are synthesized by high temperature (i.e., 450° C.) annealing, the sintering process can reduce the surface area of the support and minimize surface defects, which can hinder the deposition of active catalyst onto the support. Prior to depositing the active catalyst particles onto the non-carbon catalyst support, the surface of the non-carbon support can be modified to improve the active catalyst particle anchoring. One or both of a mechanical process and a chemical process can be used to modify the surface of the non-carbon support. Mechanical processes can include, for example, mechanical milling of the non-carbon composite support particles. Chemical processes can include, for example, etching with an acid or base or functionalizing the support surface with reactive chemical functional groups that would serve as anchoring sites for the active catalyst particles. FIG. 2 is a flow diagram of the modification process using both mechanical and chemical processes. However, the mechanical process can be used alone, or a chemical process can be used alone.

Figure 3:
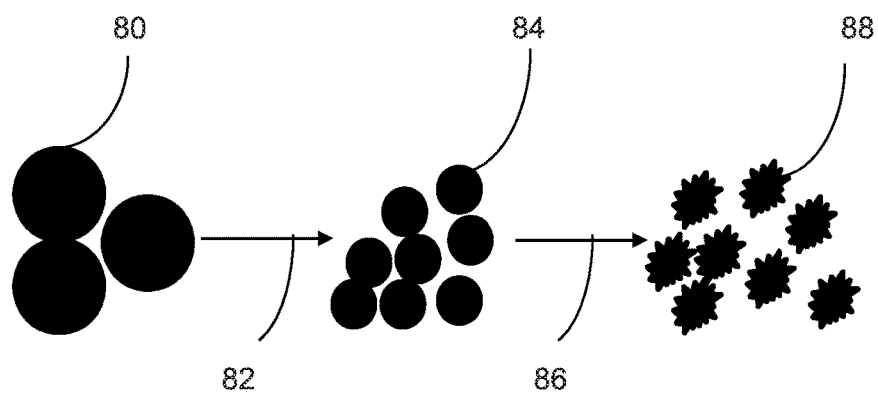
FIG. 3 is a schematic of the modification process of FIG. 2.

As shown in FIG. 2, the synthesized non-carbon catalyst support is mechanically milled in step S70 to reduce the size of the support particles, thus increasing the surface area of the non-carbon support. These fine non-carbon support particles are chemically treated in step S80 to produce defects on the surface of the fine non-carbon support particles or functional groups via which the active catalyst particles will anchor. If the chemical treatment includes acid treatment, non-limiting examples of acids used to create the surface defects include sulfuric acid and nitric acid. The chemical process can be adjusted to control the degree of defects by adjusting one or more of the temperature of the acid, the duration of the etching and the concentration of the acid used. These defects can also increase the surface area, facilitate active catalyst particle deposition and enhance the bond of the catalyst active particles with the non-carbon support particle. FIG. 3 is a schematic of the modification process using both the mechanical and chemical processes. The synthesized non-carbon support particles 80 are mechanically processed 82, resulting in fine non-carbon support particles 84. The fine non-carbon support particles 84 are chemically treated 86 to produce non-carbon support particles 88 with surface defects or functional groups.

Synthesis of Titanium Oxide-Ruthenium Oxide ($TiO_2$—$RuO_2$) Supports:

Core-shell-type $TiO_2$—$RuO_2$ catalyst supports were prepared with the following wet chemical procedure. In a typical synthesis procedure, 1 g commercial $TiO_2$ was dispersed in 250 ml deionized water and sonicated for thirty minutes. 2.59 g $RuCl_3 \cdot xH_2O$ was added into the mixture under stirring for 30 minutes. Then, 0.05 N KOH (aq) was dropped into the mixture under stirring until the pH of the solution reached seven. The black powder was filtered out and washed repeatedly with distilled water. The collected particles were dried at 120° C. for 8 hours and were named hydrous $TiO_2$—$RuO_2$. The hydrous $TiO_2$—$RuO_2$ particles were further calcined at 450° C. for 3 hours in air and were named anhydrous $TiO_2$—$RuO_2$. The mole ratio of Ru:Ti was 1:1.

Figure 4:
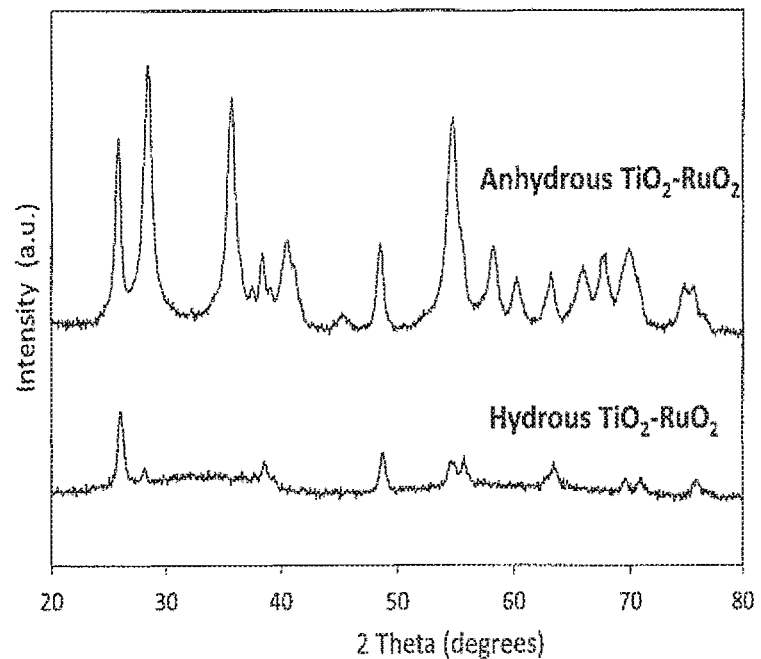
FIG. 4 is a graph of x-ray diffraction of anhydrous and hydrous $TiO_2$—$RuO_2$ support to confirm the presence of ruthenium oxide particles on the support and to obtain a quantitative estimate of their crystallite size.

Characterization of Titanium Oxide-Ruthenium Oxide ($TiO_2$—$RuO_2$) Supports:

X-ray diffraction (XRD) was used to confirm the presence of ruthenium oxide particles on the support and to obtain a quantitative estimate of their crystallite size. Referring to FIG. 4, the main diffraction peaks for hydrous $TiO_2$—$RuO_2$ around 26°, 38.5° and 49° arose from diffractions attributed to the $TiO_2$ (101), (004) and (200) planes, respectively. No peak from $RuO_2$ was observed for the powder dried at 120° C. As the support was calcined at 450° C., the main diffraction peaks of $RuO_2$ for anhydrous $TiO_2$—$RuO_2$ around 28°, 36° and 55° arose from diffractions at (110), (101) and (211) planes, respectively. The results show that hydrous particles consist of amorphous $RuO_2$ phases. No signal corresponding to a single metallic phase of ruthenium was detected. Because the supports were prepared with ambient pressure drying without using any surfactant, the materials in hydrous and anhydrous forms exhibited low and similar Brunauer, Emmett and Teller (BET) surface area, 30±3 m2/g. The electrical conductivities of anhydrous support and hydrous support were 22±4 and 10±3 S/cm, respectively.

Synthesis of Platinum Supported on Titanium Oxide-Ruthenium Oxide (Pt/$TiO_2$—$RuO_2$) Catalyst:

Platinum nanoparticles were synthesized by the chemical reduction of Pt precursor with formic acid. In a typical synthesis, a suspension of 0.54 g $TiO_2$—$RuO_2$ support in reaction solution (0.96 g $H_2PtCl_6 \cdot 6H_2O$ and 30 mL HCOOH in 600 mL of water) was sonicated for 30 minutes. All aqueous solutions were prepared with deionized water from a Millipore water system. After this initial dispersion, the solution was heated at 80° C. for 2 hours under vigorous stirring. The product was collected by vacuum filtration and washed several times with deionized water, and then dried in an oven at 60° C. Heat treatment was conducted at different temperatures for further use in characterization and electrochemical measurements.

Figure 5:
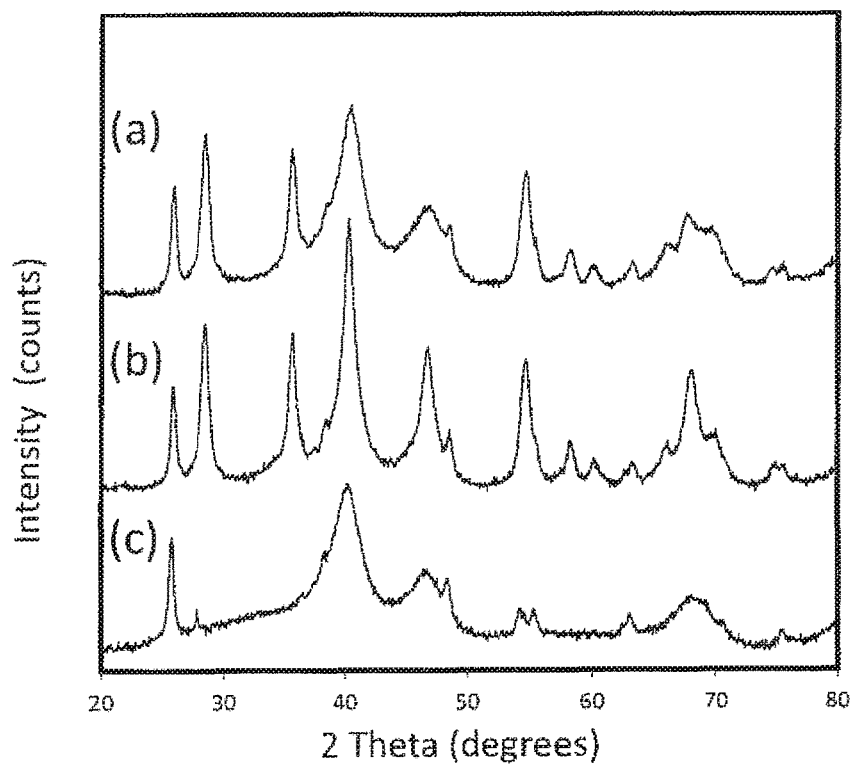
FIG. 5 is a graph of x-ray diffraction patterns of Pt deposited on (a) Pt/anhydrous $TiO_2$—$RuO_2$ (b) Pt/anhydrous $TiO_2$—$RuO_2$ with heat treatment at 450° C. and (c) Pt/hydrous $TiO_2$—$RuO_2$.
Figure 6:
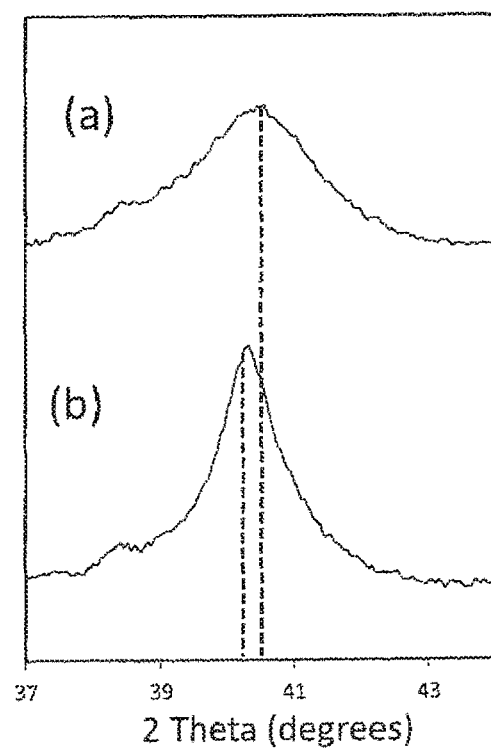
FIG. 6 is a graph of x-ray diffraction patterns illustrating the shift of Pt peak with heat treatment.

Characterization of Platinum Supported on Titanium Oxide-Ruthenium Oxide Pt/$TiO_2$—$RuO_2$ Catalyst:

FIG. 5 shows the XRD patterns of Pt deposited on (a) Pt/anhydrous $TiO_2$—$RuO_2$ (b) Pt/anhydrous $TiO_2$—$RuO_2$ with heat treatment at 450° C. and (c) Pt/hydrous $TiO_2$—$RuO_2$. It is evident that all three catalysts consist of crystalline Pt particles. The main diffraction peaks around 39°, 46° and 68° arose from diffractions at Pt (111), (200) and (220) planes, respectively. The crystallite size was then estimated using the Scherrer equation. The average Pt crystallite sizes for support materials annealed at 120° C. and 450° C. are almost identical, 6.2 nm, which indicated that Pt deposition was not affected by support materials. Furthermore, with heat treatment, Pt crystallite size increased from 6.2 nm to 14 nm, indicating the aggregation of Pt particles. Pt also formed an alloy with the support, as revealed by the shift of Pt peak in FIG. 6.

Figure 7:
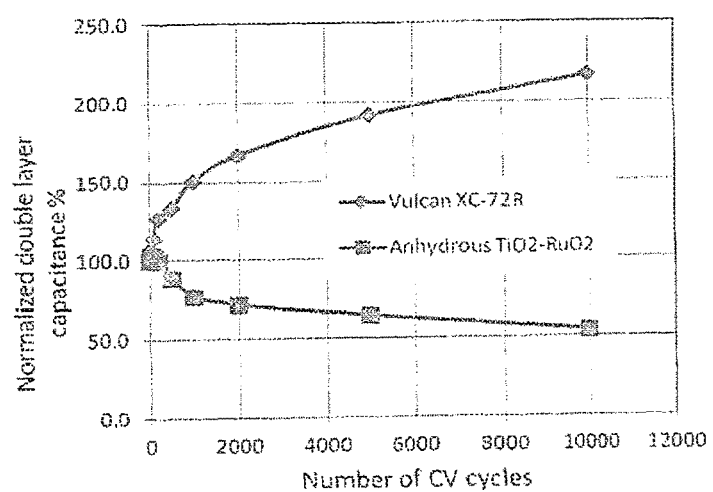
FIG. 7 is a graph of cyclic voltammograms for Vulcan XC-72R carbon and anhydrous $TiO_2$—$RuO_2$.

Stability Characterization of Titanium Oxide-Ruthenium Oxide ($TiO_2$—$RuO_2$) Supports:

The degradation of supports can be evaluated by repeated cyclic voltammetry (CV) cycles with the appropriate lower and upper potential limits in an acid solution. The durability test for the support was conducted by cycling the electrode potential between 1 and 1.5 V versus a reversible hydrogen electrode (RHE) at a scan rate of 500 mV/s in a nitrogen purged 0.1 M $HClO_4$ solution at room temperature. A shown in FIG. 7, the cyclic voltammograms for Vulcan XC-72R carbon showed a significant increase of double layer capacitance (+220%) and moderate reduction for anhydrous $TiO_2$—$RuO_2$ (-48%) as the number of cycles increased, where double layer capacitance was calculated at 0.4 V using double layer current.

Stability Characterization of Platinum Supported on Titanium Oxide-Ruthenium Oxide (Pt/$TiO_2$—$RuO_2$) Catalyst:

The degradation of catalyst can be evaluated by the loss in the electrochemical surface area (ECSA) of catalyst as a function of cycling numbers. The durability tests for the catalyst were conducted by rectangular wave potential cycle between 0.6 V (3 seconds) and 0.95 V (3 seconds) vs. normal hydrogen electrode (NHE) with cycles up to 10,000 in a nitrogen purged 0.1 M $HClO_4$ solution at room temperature. The cyclic voltammograms for commercial Pt/C catalyst and Pt/anhydrous $TiO_2$—$RuO_2$ catalyst showed a similar reduction of ECSA (42% vs. 49%) as the number of cycles increased. The ECSA of Pt/C, Pt/anhydrous $TiO_2$—$RuO_2$ without heat treatment, Pt/anhydrous $TiO_2$—$RuO_2$ with heat treatment at 200° C., and Pt/anhydrous $TiO_2$—$RuO_2$ with heat treatment at 450° C. were 52 $m^2$/g, 19 $m^2$/g, 19 $m^2$/g, and 13 $m^2$/g, respectively.

It is noted that the capacitive current at potentials between 0.4 and 0.6 V due to charging/discharging of the electrical double layer remained almost the same for all tested catalysts. The results suggest that the loss in ECSA was primarily caused by dissolution of platinum instead of support corrosion under the AST protocol. The stability of Pt/anhydrous $TiO_2$—$RuO_2$ catalyst can be improved with heat treatment. When the catalyst was annealed at 200° C. for 8 hours, the loss of ECSA decreased from 49% to 35% and the initial ECSA of the catalyst with heat treatment and that without heat treatment remained the same, which suggests that no significant Pt aggregation occurred after annealing. However, when the annealing temperature was further increased to 450° C., it was found that Pt crystallite size increased from 6.2 nm to 14 nm, indicating the aggregation of Pt particles. The stability of Pt/anhydrous $TiO_2$—$RuO_2$ catalyst significantly increased because of the larger Pt particle size and the lower surface tension.

Figure 8:
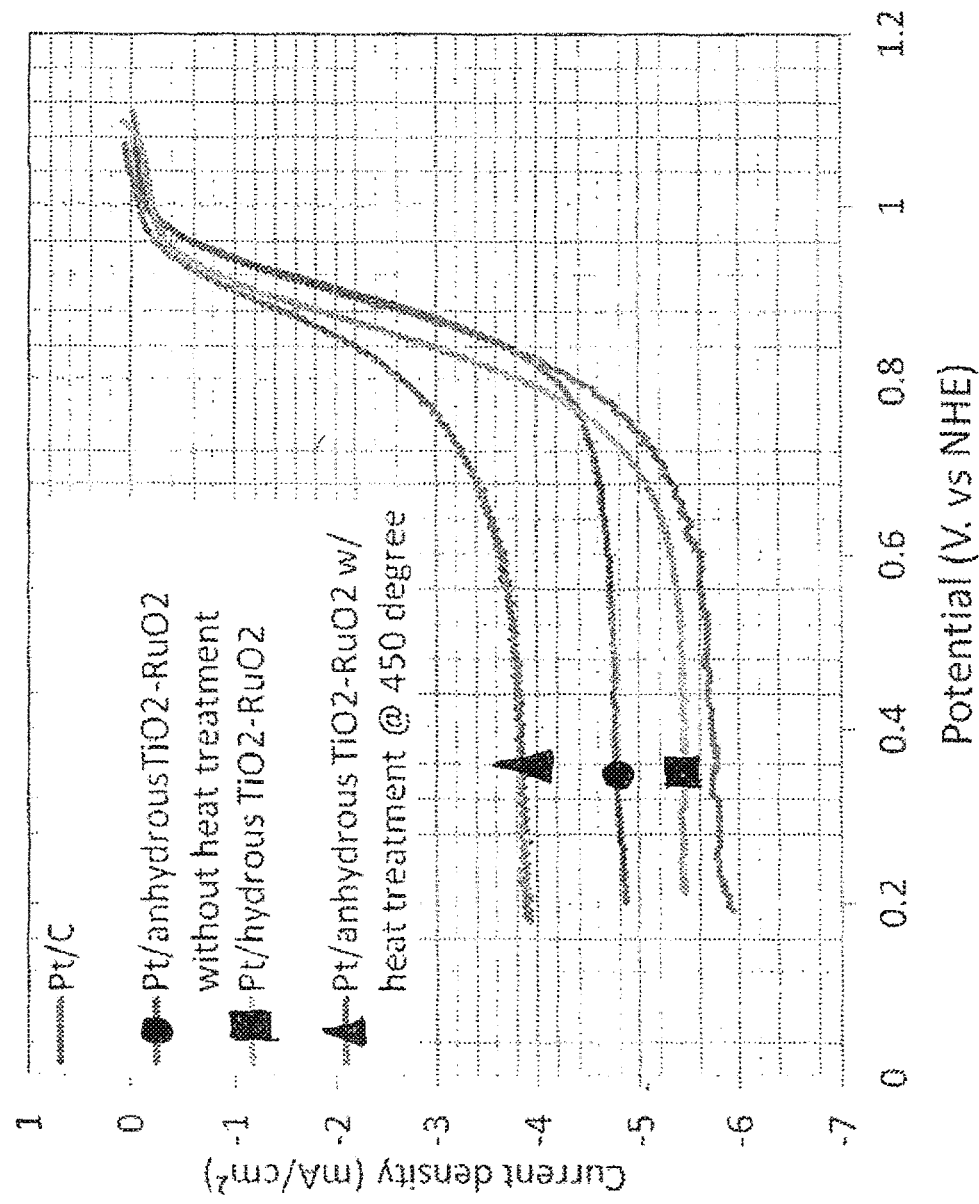
FIG. 8 is a graph of polarization curves of Pt/C, Pt/anhydrous $TiO_2$—$RuO_2$, Pt/anhydrous $TiO_2$—$RuO_2$ with heat treatment at 450° C. and Pt/hydrous $TiO_2$—$RuO_2$.

Oxygen Reduction Reaction (ORR):

FIG. 8 shows the typical ORR polarization curves of Pt/anhydrous $TiO_2$—$RuO_2$, Pt/anhydrous $TiO_2$—$RuO_2$ with heat treatment at 450° C., Pt/hydrous $TiO_2$—$RuO_2$ and commercial Pt/C obtained at room temperature in oxygen-saturated 0.1 M $HClO_4$ at 1600 rpm. The half-wave potentials of the Pt/anhydrous $TiO_2$—$RuO_2$, Pt/anhydrous $TiO_2$—$RuO_2$ with heat treatment at 450° C., Pt/hydrous $TiO_2$—$RuO_2$ and commercial Pt/C are 0.897 V, 0.846 V, 0.857 V and 0.867 V, respectively, suggesting that the activity of Pt/anhydrous $TiO_2$—$RuO_2$ is higher than that of the commercial Pt/C catalysts.

Figure 9:
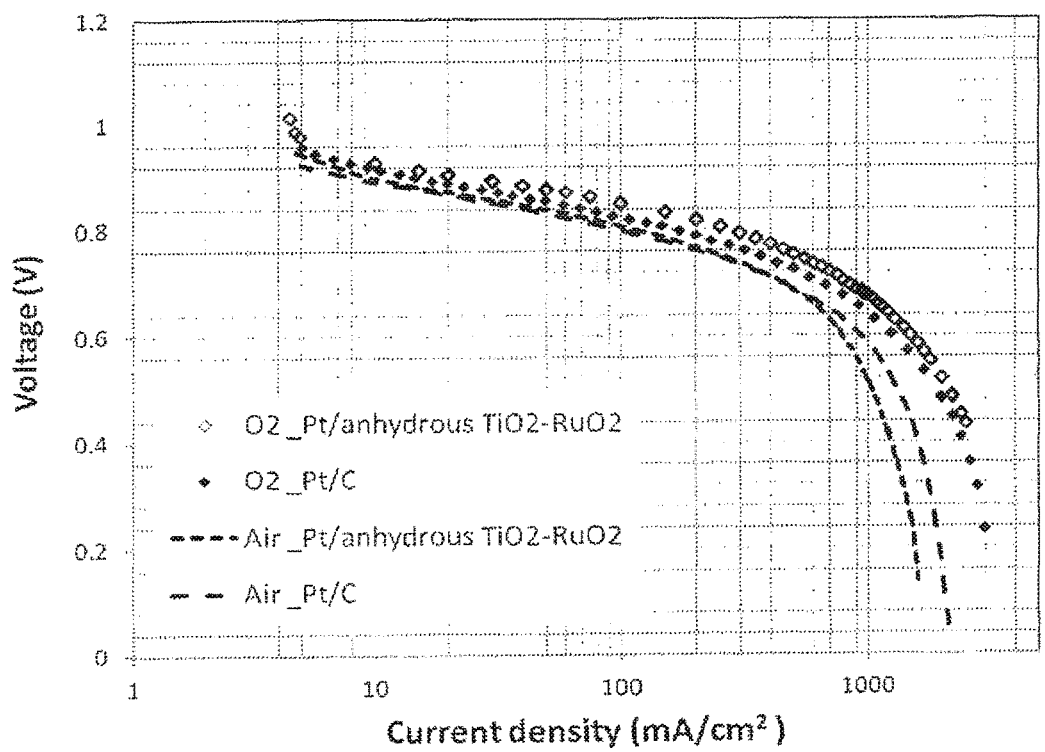
FIG. 9 is a graph showing polarization curves obtained at 80 degrees with 75% relative humidity with oxygen, air as the oxidant and hydrogen as the fuel.

Fuel Cell Performance:

Polarization curves were obtained at 80 degrees with 75% relative humidity with oxygen, air as the oxidant and hydrogen as the fuel. In this work, the cathode and the anode of a membrane electrode assembly (MEA) always shared the same electrocatalyst. For comparison, commercial Pt/C catalyst was used as a benchmark. Pt/anhydrous $TiO_2$—$RuO_2$ with oxygen as oxidant showed better performance than the commercial Pt/C catalyst as shown in FIG. 9. The cell voltage with Pt/anhydrous $TiO_2$—$RuO_2$ was 0.77 V and 0.67 V at 400 mA/$cm^2$ and 1000 mA/$cm^2$, respectively. The cell voltage with Pt/C was 0.74 V and 0.65 V at 400 mA/$cm^2$ and 1000 mA/$cm^2$, respectively.

Figure 10:
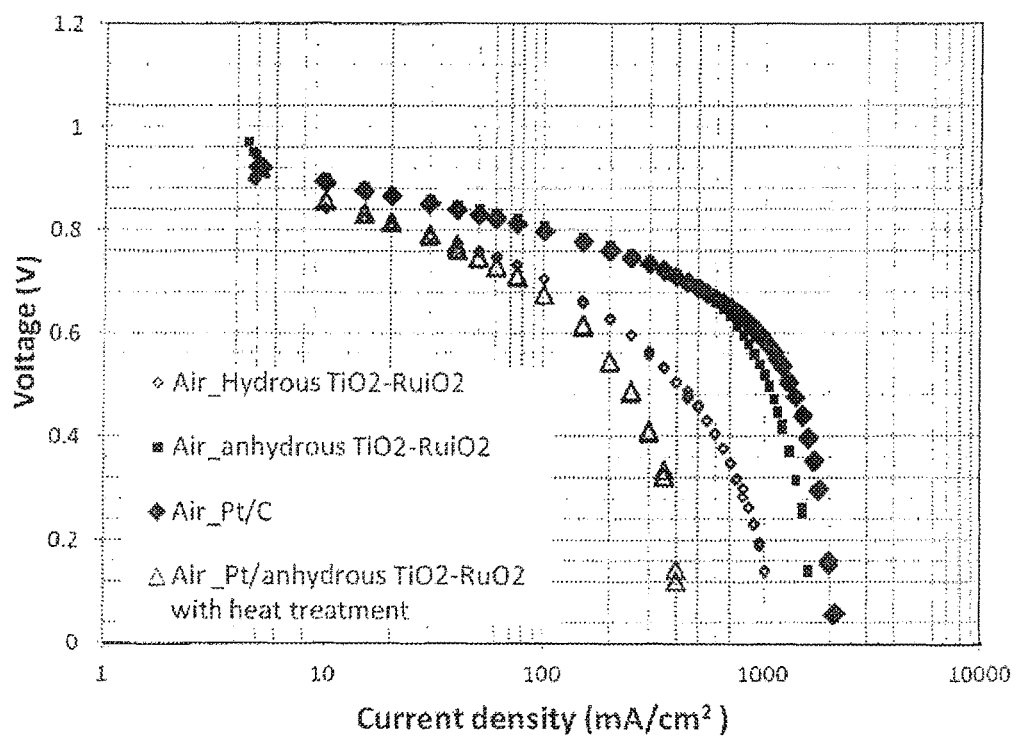
FIG. 10 is a graph showing air polarization curves of Pt/C, Pt/anhydrous $TiO_2$—$RuO_2$ without heat treatment, Pt/anhydrous $TiO_2$—$RuO_2$ with heat treatment and Pt/hydrous $TiO_2$—$RuO_2$.

FIG. 10 shows the air polarization curves of Pt/anhydrous $TiO_2$—$RuO_2$ without heat treatment, Pt/anhydrous $TiO_2$—$RuO_2$ with heat treatment and Pt/hydrous $TiO_2$—$RuO_2$, and the commercial Pt/C catalyst. The performances were consistent with the ORR activity obtained from RDE, which suggests that anhydrous $TiO_2$—$RuO_2$ acted as a co-catalyst and enhanced Pt catalytic activity; however, hydrous support interfered with Pt catalytic activity and reduced the fuel cell performance.

A second set of examples will now be presented.

$TiO_2$—$RuO_2$ (Ti:Ru mol ratio 1:1) support material was prepared by precipitation of ruthenium hydroxide on commercial $TiO_2$ nanopowder dispersed in deionized water (Aeroxide P25, BET surface area 50 $m^2$/g; Acros Organics). The powder was calcined at 450° C. for 3 h in air to yield anhydrous, electron-conducting $TiO_2$—$RuO_2$. This material had a BET surface area of 33±2 $m^2$/g and an electron conductivity of 21 S·$cm^{-1}$; both values are lower than typically reported for Vulcan carbons (~200 $m^2$·$g^{-1}$ and 30 S·$cm^{-1}$) but are reasonable for a catalyst support material. Platinum nanoparticles were deposited on the catalyst support by the reduction of hexachloroplatinic acid precursor with formic acid. The resultant Pt nanoparticles had diameters ranging between 4 and 6 nm as shown in FIGS. 11A and 11B. The relatively high particle size resulted in lower values for the ECSA.

The electrochemical stability of the $TiO_2$—$RuO_2$ support and Pt/$TiO_2$—$RuO_2$ catalyst were evaluated using accelerated stress test protocols similar to those developed by the Fuel Cell Technical Team of the US Drive Partnership in collaboration with the US Department of Energy, with some minor differences as described below. In this study, we used two different protocols that measure (i) the stability of the support due to start/shutdown voltage spikes, either standalone support or catalyzed support, the latter to investigate the impact of platinum catalyst on the support corrosion rate ("start-stop protocol"), and (ii) Pt catalyst degradation due to dissolution/Ostwald ripening as a consequence of load cycling—excursions to near the open-circuit potential—during normal fuel cell operation ("load-cycling protocol"). These protocols effectively imitate and induce, in an accelerated fashion, the degradation mechanisms that occur during extended normal fuel cell vehicle operation.

It is generally accepted by automotive OEMs that the fuel cell stack in an automobile should operate for at least 5,000 h and 60,000 startup/shutdown cycles without any significant voltage loss. To evaluate the stability of the support using the start-stop protocol, shown in FIG. 12A, the working electrode potential was cycled in a triangular waveform between 1.0 and 1.5 V at a scan rate of 500 mV/s (triangular wave form) for 5,000 cycles. Cyclic voltammograms (CV) were recorded initially (baseline) and after 100, 200, 500, 1,000, 2,000, and 5,000 cycles to characterize the support by estimating the electrode pseudocapacitance (or, in an equivalent method, the current at 0.4 V in the capacitive region of the CV).

Changes in fuel cell load occur as a consequence of the varying power demands that are incurred during a typical drive cycle. Although somewhat buffered by hybridization strategies, some level of load cycling is inevitable. To evaluate the stability of the platinum catalyst under load cycling, shown in FIG. 12B, the cathode potential was cycled in a rectangular waveform from 0.95 V (near the open circuit voltage; approaching no-load conditions) to 0.6 V (close to the maximum power; approaching full load conditions) for 10,000 cycles. Note that the US Drive load-cycling protocol is slightly different, and involves potential cycling from 0.65 to 1 V. CVs were recorded initially, and after 100, 200, 500, 1,000, 2,000, 5,000, and 10,000 cycles. The stability of the catalyst was evaluated from the measured change in ECA and in electrode polarization.

The conventional Pt/high surface area C (HSAC) support and catalyst and the Pt/TiO$_2$—RuO$_2$ were examined with both protocols described above. In the figures, the Pt/TiO$_2$—RuO$_2$ catalyst is denoted as Pt/TRO. The experiments were performed both ex situ on supports/catalysts deposited onto a glassy carbon RDE, and in situ in a fully assembled fuel cell. The experiments were always performed with the working electrode placed in a nitrogen environment to minimize side reactions. The durability ex situ experiments were performed in an RDE setup at 60° C. using 0.1 M perchloric acid as the electrolyte, a glassy carbon rod counter electrode, and a hydrogen reference electrode. Both CV (at a scan rate of 50 mV/s) and linear polarization (scan rate of 10 mV/s, various rotation rates) were performed at room temperature for ORR evaluation.

The in situ experiments were performed in a 25 cm$^2$ single fuel cell. MEAs were prepared using a Nafion 211 membrane, with anode catalyst loading of 0.4 mg/cm$^2$ Pt/HSAC and cathode catalyst loading of 0.35 mg/cm$^2$. The experiments were performed at 80° C., passing hydrogen (0.5 L/min) through the anode (counter and pseudoreference electrode) side and nitrogen through the cathode/working electrode (0.5 L/min). The gases were humidified at either 100% relative humidity (RH) or 40% RH before entry into the cell. The 100% RH operating point was chosen to maximize carbon corrosion during the accelerated test (at high voltage, carbon corrosion requires water). The 40% RH condition was chosen as a possible operating point for the fuel cell stack in an automobile.

CV and V-I polarization curves were obtained at the beginning and end of the potential cycling tests for each of the MEAs tested. The V-I polarization curves were obtained at 100% and 40% relative humidity, using hydrogen as fuel and air as oxidant. Initially, several preliminary experiments were performed to ascertain whether the in situ and ex situ approaches yielded similar results. Both methods yielded near identical results in terms of induced loss in ECSA upon exposure to said protocols.

Figure 13A:
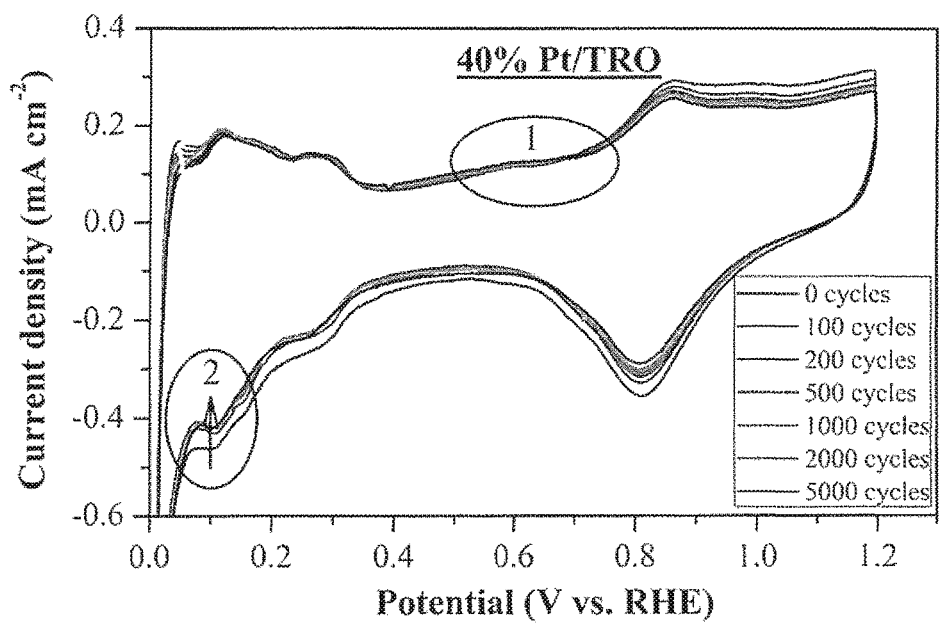
FIGS. 13A and 13B are cyclic voltammograms obtained on 40% Pt/TiO$_2$—RuO$_2$ catalyst and 50% Pt/HSAC catalyst, respectively, tested ex situ using the start-stop protocol.
Figure 13B:
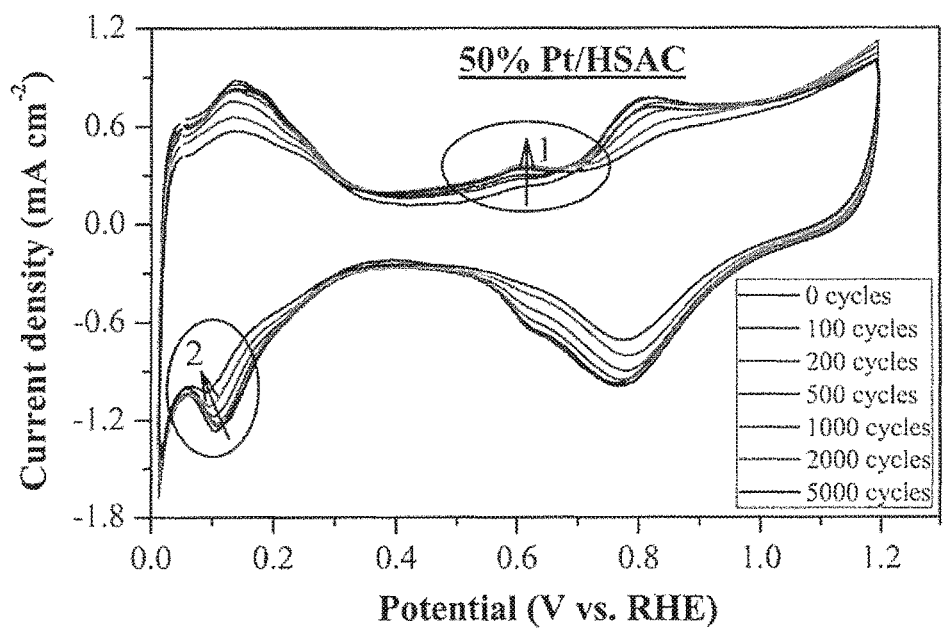

Subsequently, both catalysts were exposed to the start-stop protocol ex situ, and the impact of this test on the catalyst was studied using CV. The results are shown in FIGS. 13A and 13B. Pt/TiO$_2$—RuO$_2$ did not show any sign of surface modification or instability, as observed for Pt/HSAC, and the H$_2$ adsorption peak potential did not shift unlike in Pt/HSAC. Both observations indicated the superior stability of the TiO$_2$—RuO$_2$ support upon potential cycling.

The ratio of ionomer to support (well-studied for Pt/C) was then optimized for the Pt/TiO$_2$—RuO$_2$ catalyst via an ex situ RDE study. An optimal ionomer-to-catalyst ratio (I/C) value of 0.58 g/g was obtained (contrast with 0.43 for Pt/HSAC). The ECSA; ORR mass and specific activities; number of electrons transferred during the ORR; and the Tafel slopes for the ORR were measured for both catalysts at their optimal I/C ratios.

Figure 15A:
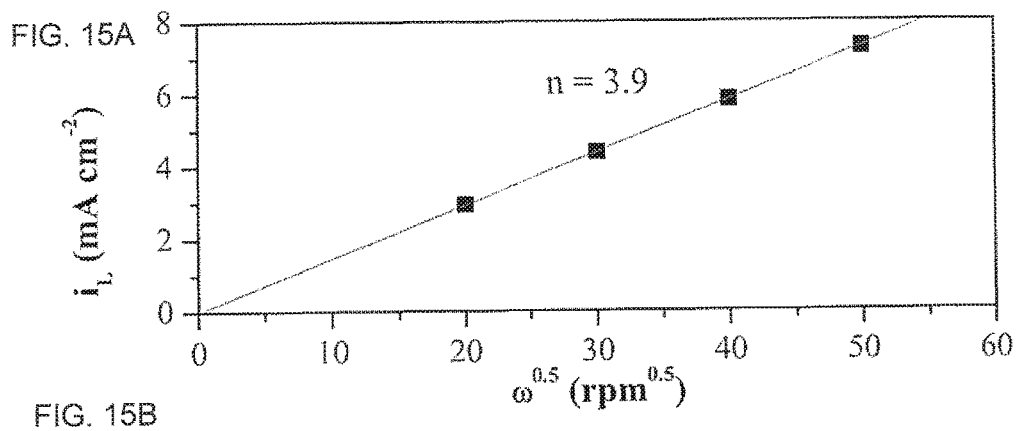
FIGS. 15A-15C are a Levich plot showing the number of electrons transferred, a Koutechy-Levich plot and a Tafel slope obtained from the kinetic currents extracted from the Koutechy-Levich plot, respectively, for 40% Pt/HSAC catalyst.
Figure 15B:
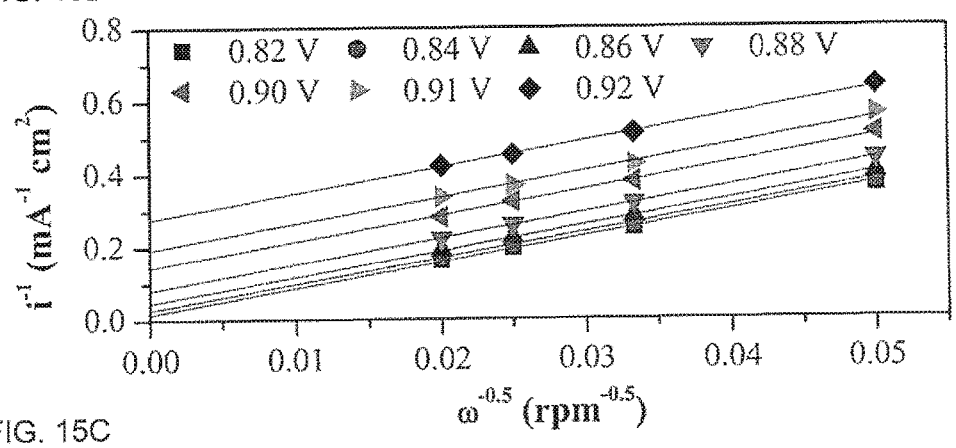
Figure 15C:
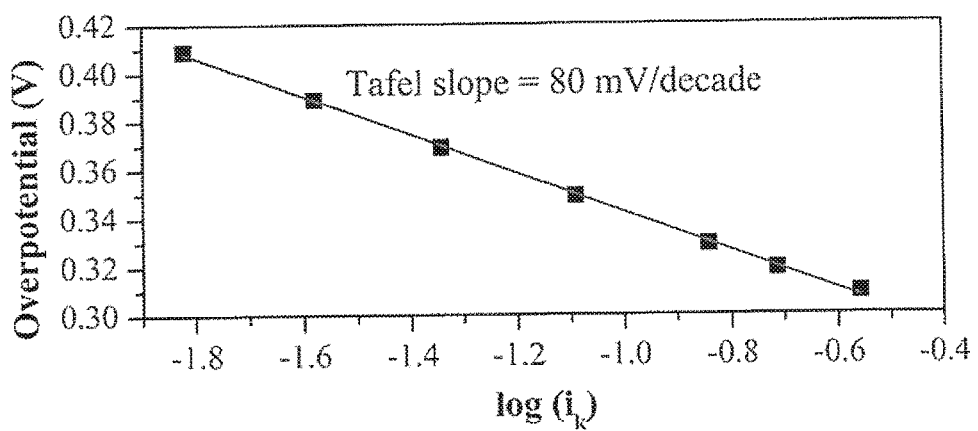

The Pt/TiO$_2$—RuO$_2$ had lower ECSA and mass activities, but a higher specific activity than Pt/HSAC due to the larger platinum particle size (4-6 nm) in Pt/HSAC. The number of electrons transferred during the ORR was estimated from a Levich plot to be 3.2 for Pt/TiO$_2$—RuO$_2$ and 3.9 for Pt/HSAC, as shown in FIGS. 14A and 15A, respectively. A Koutechy-Levich analysis was performed for each catalyst, shown in FIGS. 14B and 15B, respectively. The Tafel slopes, shown in FIGS. 14C and 15C respectively, and obtained from the kinetic currents extracted from the Koutecky-Levich analysis of FIGS. 14B and 15B, were 94 for Pt/TiO$_2$—RuO$_2$ and 80 for Pt/HSAC, respectively.

Figure 16:
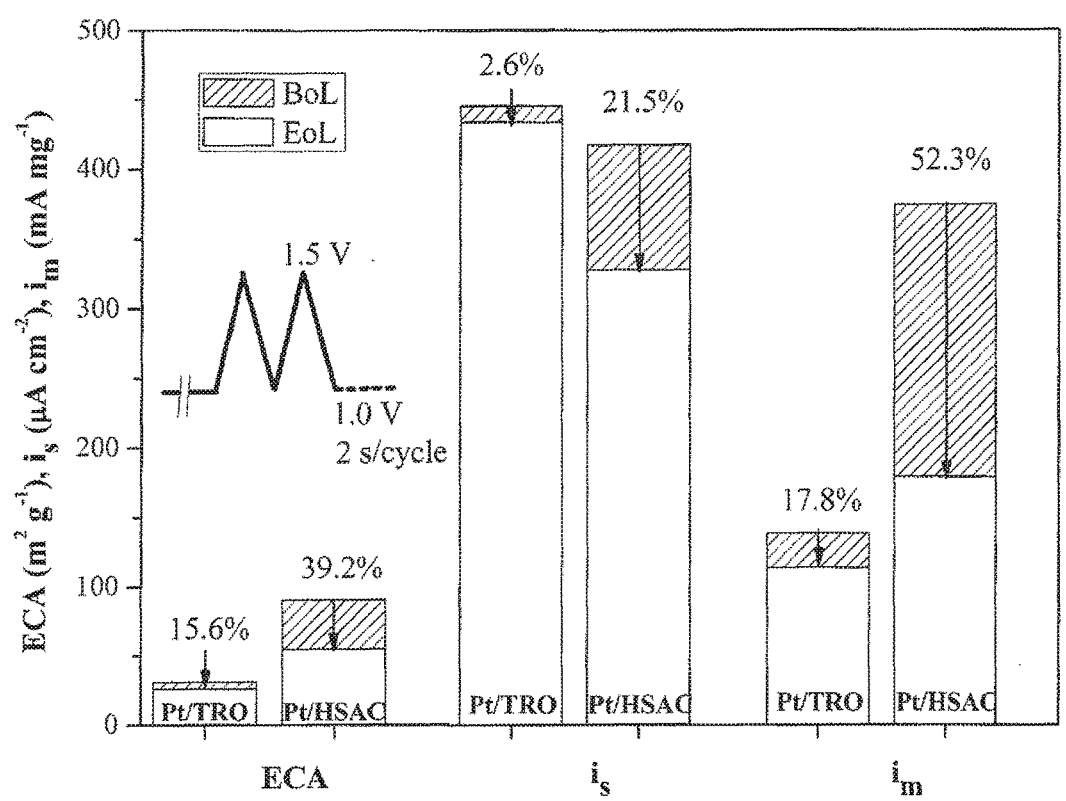
FIG. 16 is a graphic comparison of ECSA and ORR specific ($i_s$) and mass ($i_m$) activity for Pt/HSAC and Pt/TiO$_2$—RuO$_2$ catalysts before (BoL) and after (EoL) the start-stop protocol.

The ECSA, mass activity ($i_m$), and specific activity ($i_s$) of Pt/TiO$_2$—RuO$_2$ and Pt/HSAC were then estimated for both catalysts upon exposure to the start-stop protocol ex situ shown in FIG. 12A. The TiO$_2$—RuO$_2$ support showed much better stability than high surface area carbon. As shown in FIG. 16, the loss in ECSA, specific activity, and mass activity after 5,000 start-stop cycles were, respectively, 15.6%, 2.6%, and 17.8% for Pt/TiO$_2$—RuO$_2$. In comparison, Pt/HSAC was much more severely degraded. The ECSA dropped by 39.2%, specific activity dropped by 21.5%, and mass activity dropped by 52.3%. These ex situ studies suggest that TiO$_2$—RuO$_2$ is a very stable support and that Pt/TiO$_2$—RuO$_2$ is indeed a much more stable electrocatalyst than Pt/HSAC, albeit perhaps less active due to the larger platinum particle size. Mass activity and specific activity are good indicators of the quality of an electrocatalyst. The specific activities ($i_s$) and mass activities ($i_m$) suggest that Pt/TiO$_2$—RuO$_2$ demonstrates high electrocatalyst activity. Pt/TiO$_2$—RuO$_2$ has a similar mass activity (83 mA/mg at 0.9V vs. RHE) and a significantly higher (487 vs. 151 µA/cm$^2$) specific activity than Pt/C.

Figure 17:
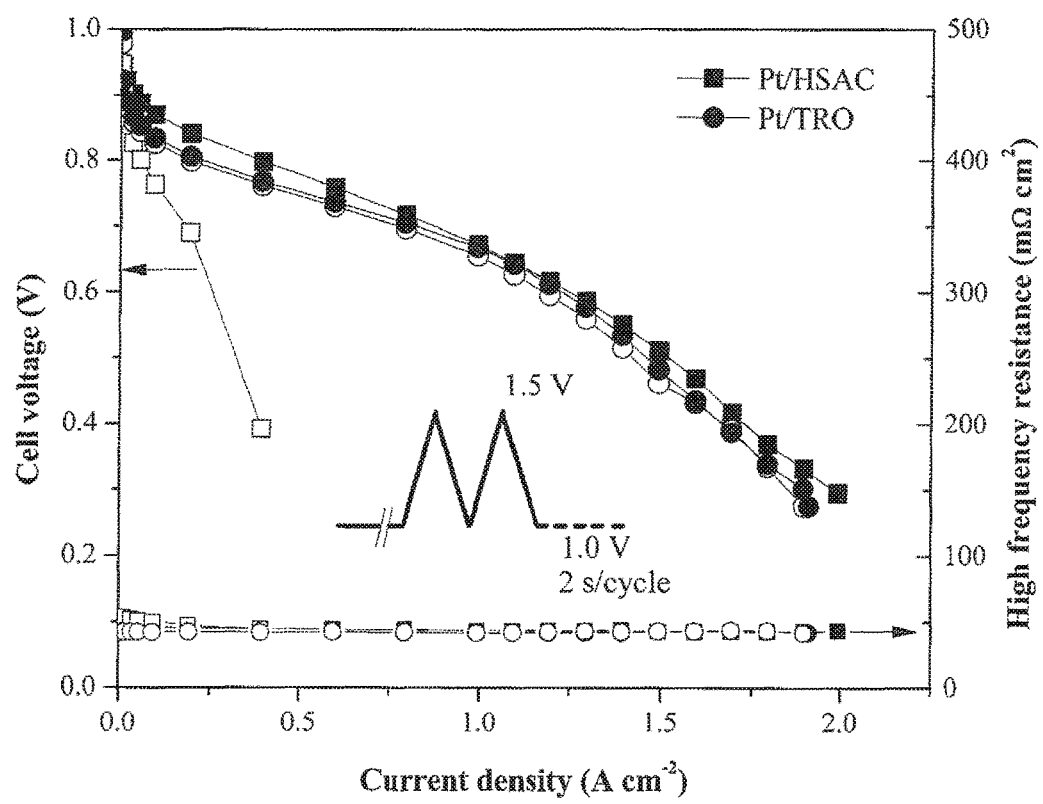
FIG. 17 is a graphic comparison of fuel cell performance at 100% RH obtained with Pt/HSAC and Pt/TiO$_2$—RuO$_2$ before and after exposure to the start-stop protocol.
Figure 18:
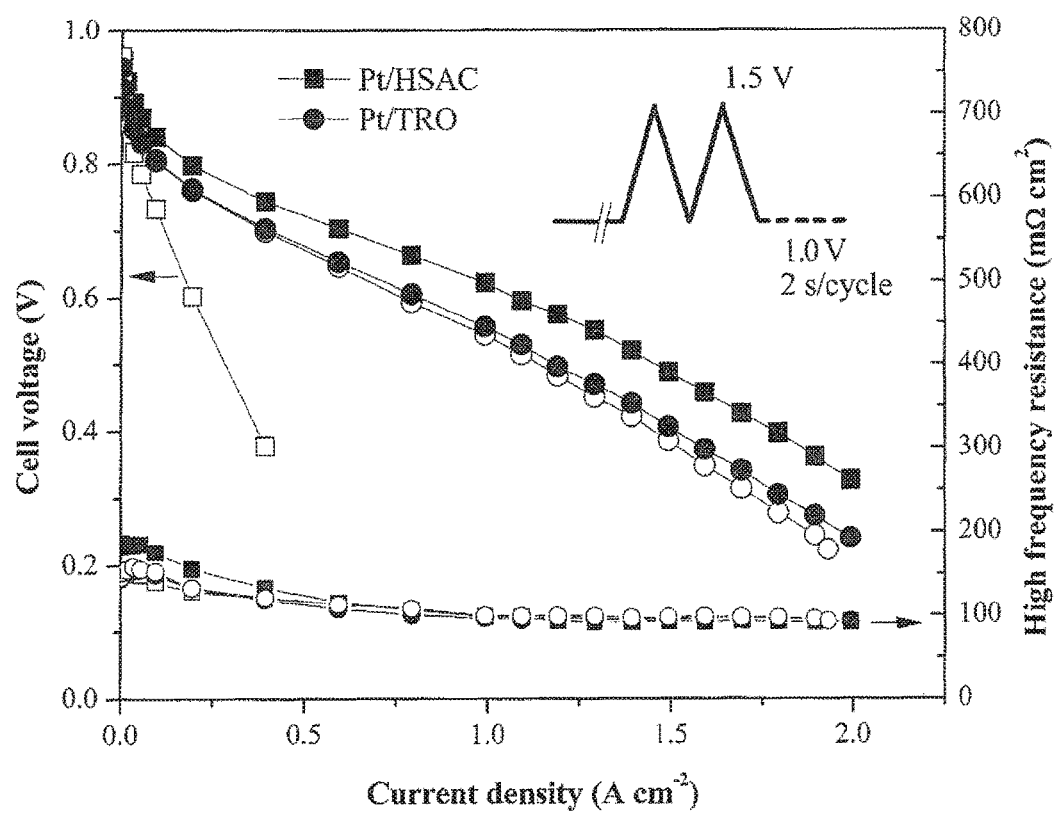
FIG. 18 is a graphical comparison of fuel cell performance at 40% RH obtained with Pt/HSAC and Pt/TiO$_2$—RuO$_2$ before and after exposure to the start-stop protocol.

In situ accelerated degradation tests were then performed on MEAs. FIG. 17 shows the polarization curves obtained (at 100% RH) on MEAs prepared with Pt/TiO$_2$—RuO$_2$ and Pt/HSAC before and after exposure to the start-stop protocol, in situ. There are two significant observations to note. First, despite the larger Pt particle size, and concomitantly lower ECSA and mass activity as ascertained by ex situ RDE tests, the Pt/TiO$_2$—RuO$_2$ electrocatalyst yielded an initial MEA performance that was slightly lower (especially at lower current densities) to that obtained with an established benchmark in line with industry standards. This finding indicates that the Pt/TiO$_2$—RuO$_2$ catalyst is very much viable in terms of catalytic activity and performance. Second, and even more significantly, whereas the Pt/HSAC MEA revealed a very significant (and most likely catastrophic) loss in performance, the Pt/TiO$_2$—RuO$_2$ shows minimal loss in performance upon exposure to 1,000 start-stop cycles. The loss in cell voltage at 1 A/cm$^2$ at 100% RH is only ~15 mV for Pt/TiO$_2$—RuO$_2$, whereas the corresponding loss is too high to permit operation at 1 A/cm$^2$ for Pt/HSAC, whose MEA failed at a current density of ~0.4 A/cm$^2$. The 40% RH data, shown in FIG. 18, revealed a similar trend in terms of stability—exceptional stability for Pt/TiO$_2$—RuO$_2$ as opposed to very poor stability for Pt/HSAC. These observations are attributed to the much higher stability of the TiO$_2$—RuO$_2$ support compared with HSAC.

Figure 19A:
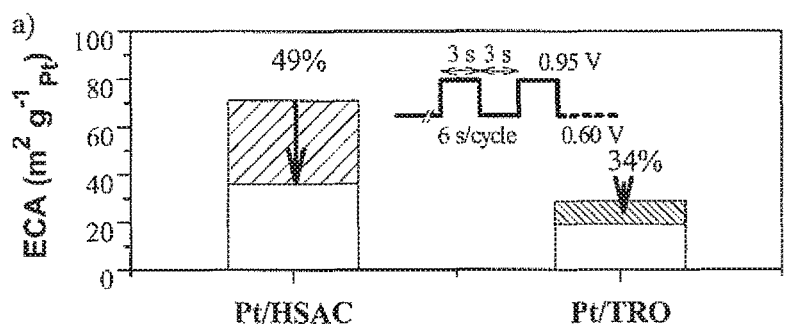
FIGS. 19A-19C are graphs illustrating fuel cell performance of 40% Pt/TiO$_2$—RuO$_2$ and Pt/HSAC catalyst upon exposure to the load-cycling protocol with FIG. 19A being a graph of ECSA of the catalysts before the test (BoL) and after (EoL) at 10,000 cycles at 80° C. and 40% relative humidity, FIG. 19B illustrating polarization curves before (closed symbols) and after (open symbols) the test at 80° C. and 40% relative humidity and FIG. 19C showing a comparison of cell voltage losses at 1 A/cm−2 for each catalyst depending on the relative humidity used during the load-cycling protocol.

MEAs prepared with each catalyst were then exposed to the load-cycling protocol shown in FIG. 12B. Both catalysts were tested in an MEA at 80° C. and both 40% and 100% inlet relative humidity to ascertain catalyst stability upon exposure to the load cycling protocol and the impact of any deterioration in the catalyst on fuel cell performance. FIG. 19A shows the initial and post-test ECSAs of each catalyst. Both catalysts, as expected, were impacted negatively by this test, which creates conditions for Pt dissolution and migration. The goal in this study is to prepare a support that is resistant to corrosion/oxidation. But efforts were taken to stabilize the Pt catalyst on the support by functionalizing the surface of the support prior to depositing the active catalyst particles. One or both of the mechanical process and the chemical process described with reference to FIGS. 2 and 3 can be used to functionalize the surface of the non-carbon support.

Figure 19B:
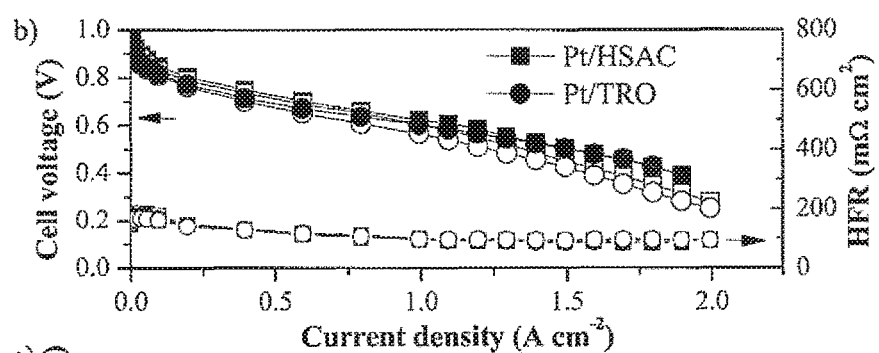
Figure 19C:
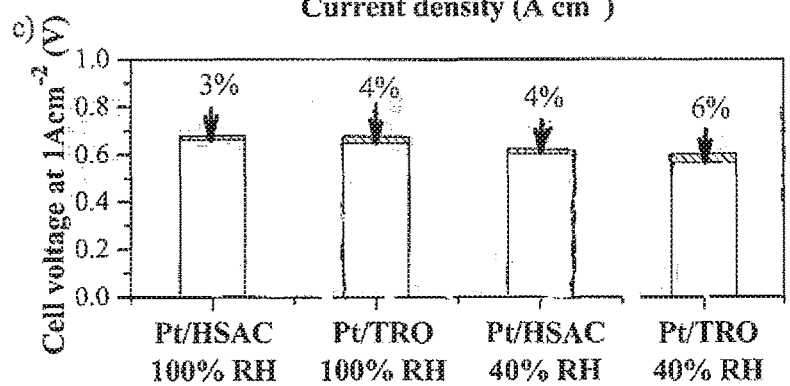

FIGS. 19B and 19C show that despite the loss in ECSA, the actual impact in performance is at best minimal, suggesting that the platinum dissolution does not necessarily lead to rapid cell failure. At an expected operating point of 1 A/cm$^2$, at most, a 6% loss in performance is seen after the load-cycling test, and there is little to differentiate between the catalysts in terms of performance loss. This finding is different from the steep and catastrophic loss in performance seen in the Pt/HSAC catalyst upon exposure to the start-stop protocol. This result suggests that the stability of the support is much more important, from the context of cell and stack failure, than the stability of the platinum particles that are loaded onto the support.

Figure 20:
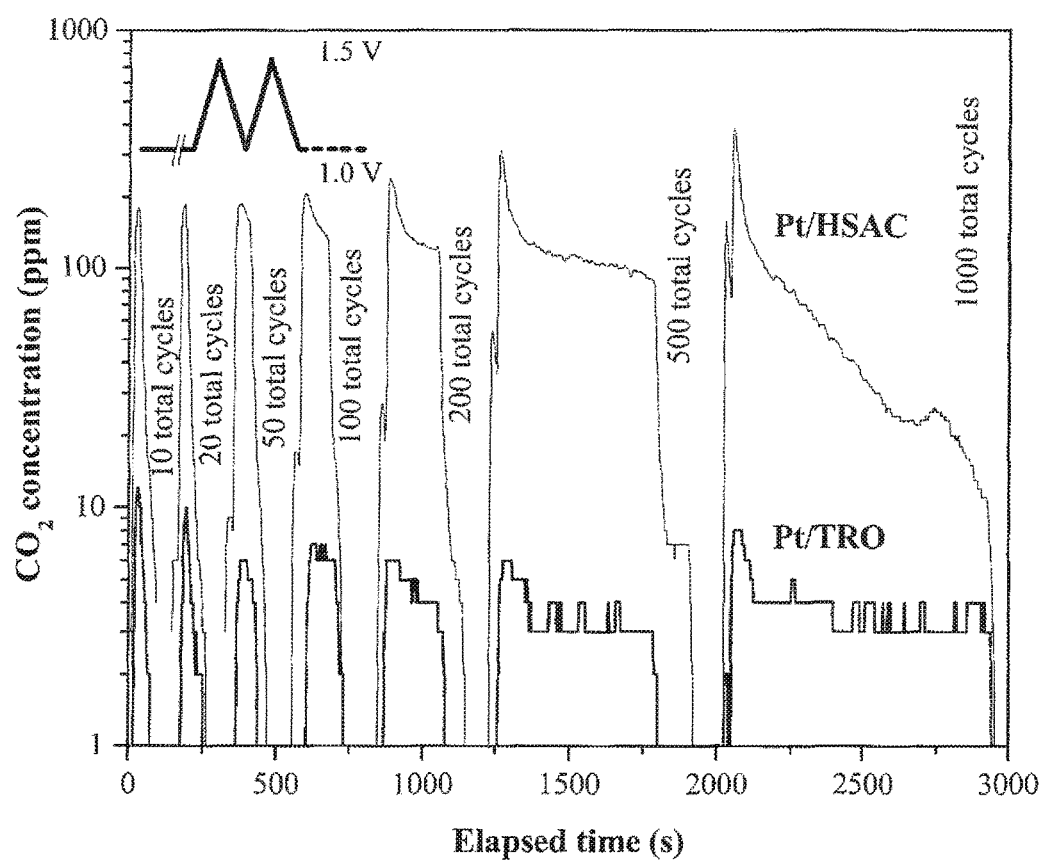
FIG. 20 is a graph illustrating evolution of carbon dioxide in the cathode exit stream during the in situ support durability test (start-stop protocol) for Pt/HSAC and Pt/TiO$_2$—RuO$_2$ catalysts.

Finally, we measured the carbon dioxide concentration in the cathode exit stream during the accelerated degradation test (start-stop protocol) and found extremely low levels of $CO_2$ (between 3 and 10 ppm) in the case of Pt/$TiO_2$—$RuO_2$ (FIG. 20). In contrast, the $CO_2$ emission levels from a conventional Pt/HSAC catalyst were ~200 ppm. Of course, the Pt/$TiO_2$—$RuO_2$ is carbon-free, and no $CO_2$ emission would emanate from this material. This observation is, however, a clear indicator that the main source of carbon being oxidized to carbon dioxide in an MEA is the carbon catalyst support, and not the gas diffusion layer (GDL) or the graphite flow fields. Both MEAs in this study use identical GDLs and flow fields. It is believed the small amount of $CO_2$ observed in the MEA prepared with Pt/$TiO_2$—$RuO_2$ arose from the corrosion of carbon in the microporous layer of GDL. This is a unique method to quantify the corrosion rate (in situ) of the carbon in the GDL microporous layer. The Pt/$TiO_2$—$RuO_2$ catalyst can be used in the future in conjunction with carbon dioxide monitoring to measure the corrosion rate of candidate GDLs.

Both in situ and ex situ experiments confirmed that $TiO_2$—$RuO_2$ is an exceptionally stable catalyst support, and that Pt/$TiO_2$—$RuO_2$ is an exceptionally stable electrocatalyst that yields initial (and final) fuel cell performance slightly lower than Pt/HSAC catalyst.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of preparing a non-carbon support particle for use supporting active catalyst particles in electrocatalyst, the method comprising:
   dispersing titanium dioxide nanopowder in liquid and mixing for a first period of time;
   precipitating ruthenium hydroxide on the titanium dioxide nanopowder to form non-carbon support particles consisting essentially of titanium dioxide and ruthenium dioxide;
   filtering the non-carbon support particles from the liquid; and
   drying the non-carbon support particles, wherein titanium and ruthenium have a mole ratio between 9:1 and 3:1 in the non-carbon support particle, the titanium dioxide has a first particle size and the ruthenium dioxide has a second particle size, the first particle size being equal to the second particle size.

2. The method of claim 1, further comprising calcining the non-carbon support particles in air.

3. The method of claim 2, wherein the calcining is performed at 450° C.

4. The method of claim 1, wherein precipitating ruthenium hydroxide comprises:
   adding ruthenium chloride hydrate to the liquid and further mixing for a second period of time to form a solution; and
   adjusting a pH of the solution to seven.

5. The method of claim 1, wherein the non-carbon support particles consist essentially of a mole ratio between 9:1 and 6:1 of titanium dioxide and ruthenium dioxide.

6. The method of claim 1, further comprising:
   modifying a surface of the dried non-carbon support particles with a chemical process configured to promote adhesion of active catalyst particles.

7. The method of claim 1, further comprising:
   increasing a surface area of the dried non-carbon support particles with mechanical milling.

8. The method of claim 6, further comprising:
   increasing a surface area of the dried non-carbon support particles with mechanical milling prior to modifying the surface.

9. A method of preparing a non-carbon electrocatalyst comprising the method of claim 1, and further comprising depositing precious metal active particles on the non-carbon support particles by reducing an active catalyst precursor with acid.

10. The method of claim 9, wherein the precious metal active particles are platinum particles.

* * * * *